United States Patent [19]

Garrison et al.

[11] 4,166,353

[45] Sep. 4, 1979

[54] TWO-WAY RAKE

[75] Inventors: Harold K. Garrison, Newton; Martin E. Pruitt, Hesston, both of Kans.

[73] Assignee: Hesston Corporation, Hesston, Kans.

[21] Appl. No.: 808,333

[22] Filed: Jun. 20, 1977

[51] Int. Cl.² ............................................. A01D 77/06
[52] U.S. Cl. ............................................................ 56/377
[58] Field of Search ..................... 36/365, 366, 377, 1, 36/218

[56] References Cited

U.S. PATENT DOCUMENTS

| | | | |
|---|---|---|---|
| 2,436,475 | 2/1948 | Jones et al. | 56/377 |
| 3,097,470 | 7/1963 | van der Lely | 56/366 |
| 3,217,481 | 11/1965 | Remy | 56/366 |
| 3,321,895 | 5/1967 | Morkoski | 56/377 |
| 3,546,869 | 12/1970 | Weaver | 56/377 |
| 3,832,837 | 9/1974 | Burkhart et al. | 56/218 |
| 4,018,036 | 4/1977 | Cicci et al. | 56/1 |

*Primary Examiner*—Russell R. Kinsey

*Attorney, Agent, or Firm*—Schmidt, Johnson, Hovey & Williams

[57] ABSTRACT

The pull-type rake is designed to remain in a preselected trailing position relative to the towing vehicle while the raking head may be cocked to the right or left without the operator leaving the driver's seat, thereby placing the head in condition to deliver raked material leftwardly or rightwardly depending upon the selected angular position for the head. The main chassis of the implement is constructed in the form of a parallel, four-bar linkage that may be skewed by the operator into leftwardly or rightwardly oblique positions relative to the path of travel of the implement, thereby cocking the rake head accordingly, and the head itself includes a frame and a reel carried thereby, both of which are constructed in the nature of parallel, four-bar linkages so that they, too, can be skewed by the operator. In a fully skewed position, crop-engaging tines of the reel move leftwardly or rightwardly at substantially right angles to the path of travel of the implement so as to maximize the efficiency of the side-delivery action of the rake.

23 Claims, 8 Drawing Figures

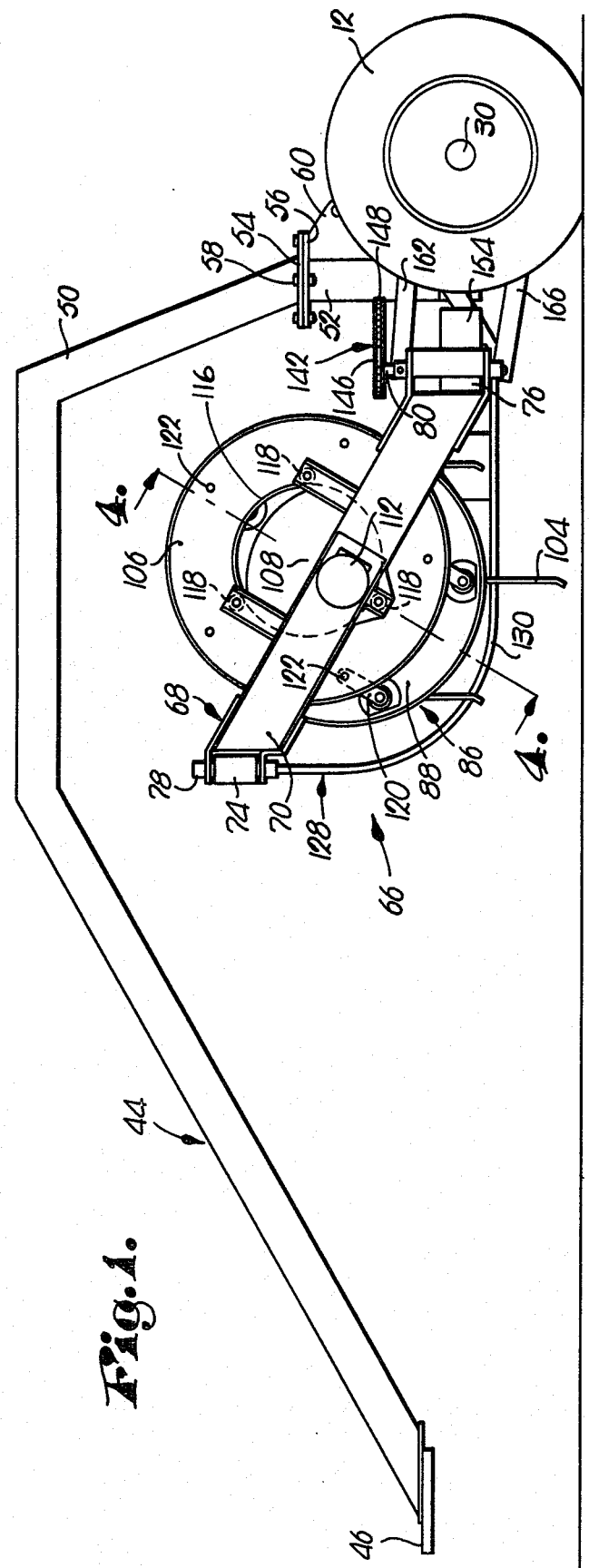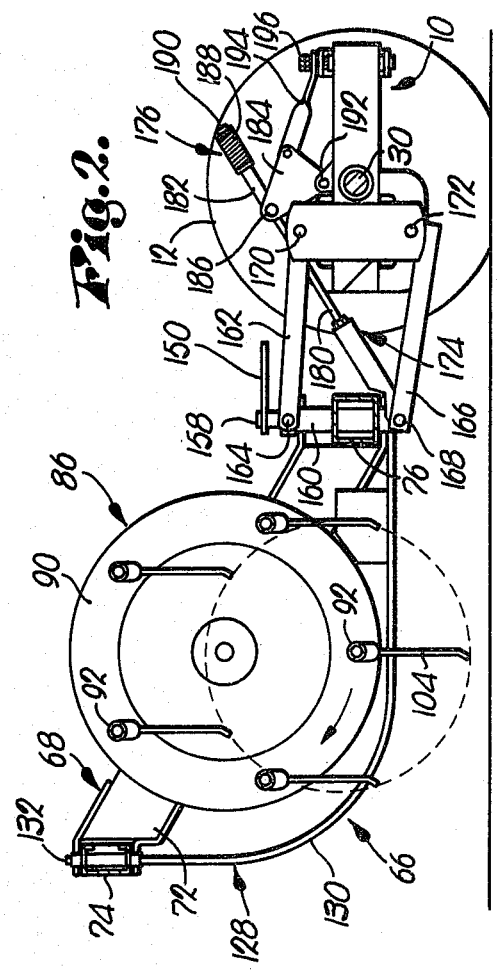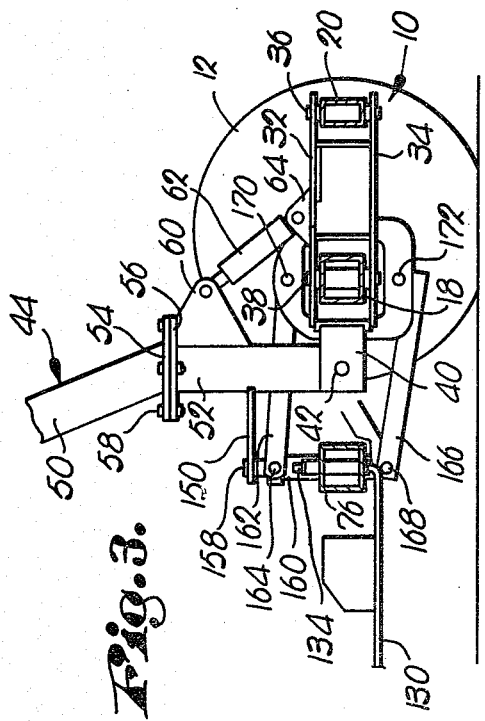

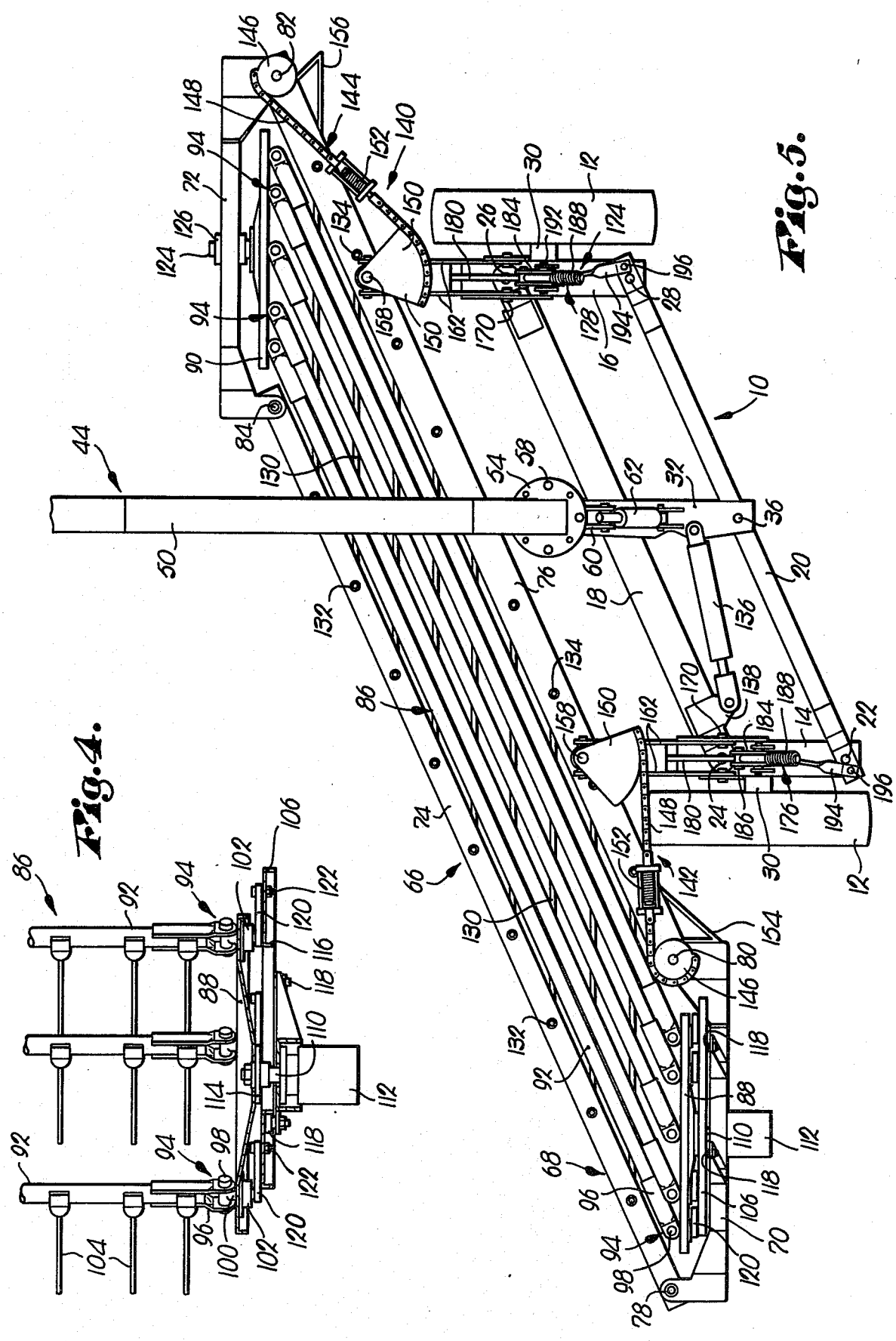

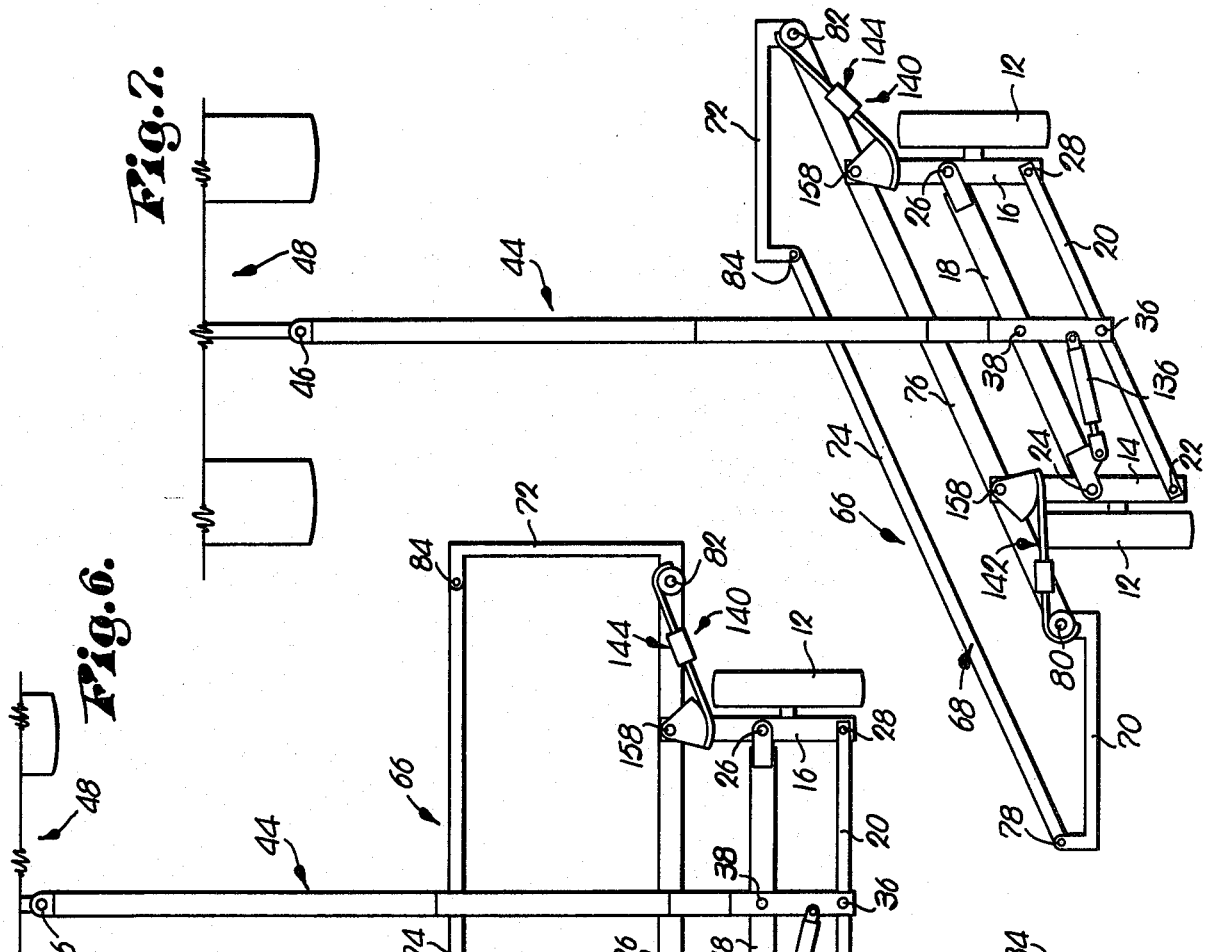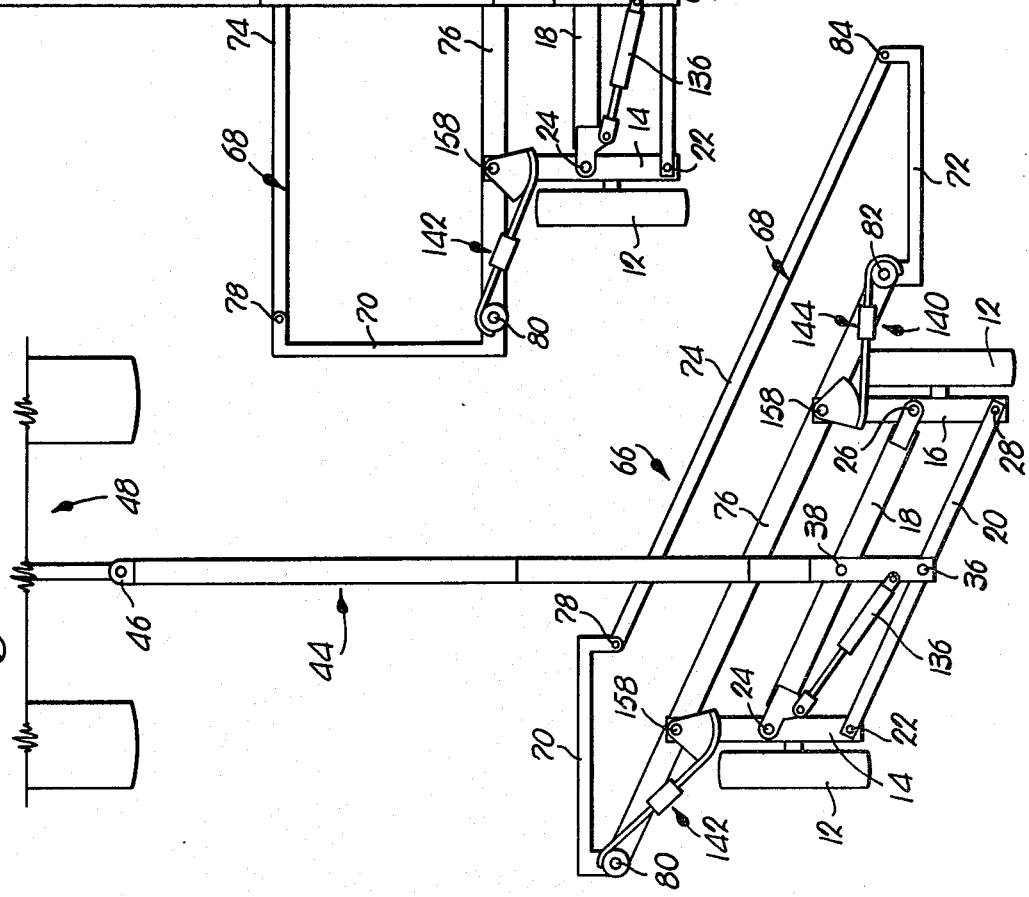

TWO-WAY RAKE

This invention relates to a towable rake or the like whose direction of crop delivery may be changed from left to right, and vice versa, without requiring that the operator leave the driver's seat of the towing vehicle. Rake constructions are presently known to exist that permit the operator to adjust the direction of delivery of the towed rake by climbing down from the vehicle and making appropriate mechanical changes or adjustments back at the rake, but oftentimes such manipulations involve considerable time and effort, amounting to steps which the operator would, thus, be inclined to perform prior to actually beginning field operations during initial setup of the implement. Thus, the flexibility of changing the direction of side delivery in pull-type raking while "on-the-go" has heretofore been lacking and stands as one major objective of the present invention.

Another important object of this invention is to achieve the ability to switch the directions of delivery as aforesaid in a pull-type implement while also achieving movement of the raking tines at substantially right angles to the normal path of travel of the implement, thereby maximizing the efficiency of that part of the cycle of movement of the tines devoted to lateral delivery of the crop.

A further important object of this invention is to achieve the desired switching of directions of delivery without causing a consequent lateral change in the trailing position of the implement.

In carrying out the foregoing objects, it is additionally important to provide a main chassis for the rake that is constructed in the nature of a parallel, four-bar linkage that may be skewed into opposite oblique positions relative to the path of travel of the implement so as to cock the rake head accordingly.

Further, it is an important provision of this invention to construct the rake head or other similar piece of equipment so that it, too, is constructed in accordance with the principles of parallel, four-bar linkages and may be skewed appropriately upon similar action by the chassis, the result of which is to drive the crop-engaging tines of the reel on the head in the desired right angle directions with respect to the path of travel of the implement.

A still further important object of the invention is to accomplish such skewing of the rake head in an amount that corresponds to that achieved by the chassis notwithstanding the fact that the head is mounted for vertical flotation and such proper skewing may be necessary in any number of selected vertical flotation positions.

Additionally, an important feature of the invention resides in the fact that although the rake head may place a disproportionate amount of its mass on one side or the other of the center line of the implement when the head is fully skewed, such asymmetrical loading is automatically compensated for by a special flotation system so as to discourage dipping of one end of the rake head relative to the other.

In the drawings:

FIG. 1 is a side elevational view of an implement constructed in accordance with the principles of the present invention, the chassis and crop-handling head carried thereby being illustrated in an unskewed, straightforward condition;

FIG. 2 is a vertical cross-sectional view through the implement of FIG. 1 taken slightly inboard of the left wheel thereof, the head being illustrated in its fully roading position as in FIG. 1, but phantom lines being used to illustrate the lowered, working position thereof, the tongue and certain other components being removed for clarity;

FIG. 3 is a vertical cross-sectional view through the implement similar to FIG. 2, but leaving out certain components and showing others as contrasted to the showing of FIG. 2;

FIG. 4 is a fragmentary, cross-sectional view through the head taken along line 4—4 of FIG. 1;

FIG. 5 is a top plan view of the implement in condition for leftward delivery of the crop materials encountered by the head; and FIGS. 6, 7 and 8 are schematic views of the implement on a reduced scale illustrating the same in condition for over-the-road travel, left or right delivery, respectively.

The implement has a chassis broadly denoted by the numeral 10 that is rendered mobile by a pair of ground-engaging wheels 12 on opposite sides of the implement. Chassis 10 is constructed from a plurality of beams 14, 16, 18 and 20 arranged in the form of a parallel, four-bar linkage, there being upright pivots 22, 24, 26 and 28 at four corners of the linkage. The two side beams 14 and 16 of the chassis 10 each have a laterally outwardly extending stub axle 30 that rotatably supports the proximal wheel 12.

A pair of upper and lower straps 32 and 34, respectively, interconnect the front beam 18 and the rear beam 20 in the center of the chassis 10 through upright pivots 36 and 38 at opposite ends of the straps 32, 34, the latter extending in parallelism with the side beams 14 and 16. The two straps 32, 34 extend forwardly beyond the front pivot 38 a short distance and are rigidly connected at that point to a forwardly extending mount 40 that makes a horizontal pivot connection 42 with the lowermost end of an upwardly arched, rigid towing tongue 44 having hitch means 46 at the forwardmost end thereof for connecting the same to a towing vehicle 48 (FIGS. 6, 7 and 8).

The tongue 44 is in two parts, having a major, arcuate part 50 and a minor or shorter part 52 that is substantially upright and defines the lower end of tongue 44 attached to the mount 40. A pair of superimposed flanges 54 and 56 at the adjacent ends of the two parts 50, 52 are releasably held in abutting relationship by a series of circumferentially spaced fasteners 58, the removal of which permits the arcuate part 50 to be rotatably repositioned relative to the upright part 52 for the purpose of changing the draft angle on the tongue 44 and, thus, the lateral position of the implement behind the vehicle 48. Replacement of the fasteners 58 will, of course, prevent relative adjustment of the parts 50 and 52 such as to maintain the implement in a preselected laterally offset or in-line position behind the vehicle 48.

A rearwardly extending lug 60 on the upright part 52 of the tongue 44 serves as one connecting point for a hydraulic piston and cylinder unit 62 having its opposite end pivotally connected to an upright lug 64 on the strap 32. Thus, when the hitch means 46 is attached to a towing vehicle 48 so as to hold the forwardmost end of the tongue 44 in a selected vertical disposition, actuation of the unit 62 will cause the chassis 10 to tilt upwardly or downwardly about the axles 30 as the joint between the chassis 10 and the tongue 44 at pivot 42 tends to buckle and unbuckle, this for a purpose yet to be described.

Crop delivery means in the form of a raking head 66 is carried by the chassis 10 forwardly of the ground wheels 12 and beneath the arch of the tongue 44. The components of the head 66 are constructed in accordance with the principles of parallel, four-bar linkages as in the case of the chassis 10, and to this end, the head 66 includes a frame 68 having four beams 70, 72, 74 and 76 thereof arranged in the form of such a linkage. Upright pivots 78, 80, 82 and 84 at four corners of the frame 68 pivotally attach the side members 70, 72 in parallel relationship to one another and the front and rear members 74, 76 in parallel relationship to one another, thus permitting the frame 68 to be skewed between the extreme conditions being illustrated in FIGS. 7 and 8 or maintained in the straightforward, unskewed position for roading as illustrated in FIG. 6.

The rake head 66 or delivery means also includes a reel that is broadly denoted by the numeral 86. As explained above, the components of the head 66 are constructed along the lines of four-bar linkages, and to this end the reel 86 contains a pair of opposite end support plates 88 and 90 that are maintained in parallel relationship to one another and to the end members 70, 72, the plates 88 and 90 being rotatably supported by respective ones of such members 70, 72.

The reel 86 also includes a series of five parallel tine bars 92 that are disposed also in parallel relationship to the front and rear members 74, 76 and are attached at their opposite ends to the plates 88, 90 at uniformly circumferentially spaced locations therearound. Partial universal joints 94 are utilized at the opposite ends of the bars 92 to connect the latter with the plates 88 and 90 in such a way that there can be relative rotation between the bars 92 and the plates 88, 90 about axes parallel to the axes of rotation of the latter, as well as relative swinging movement between the bars 92 and the plates 88, 90 about upright axes when the head 96 is being shifted between its oppositely skewed positions of FIGS. 7 and 8.

Details of the manner in which the rods 92 are attached to the plates 88 and 90 are illustrated in FIG. 4, and reference may be conveniently had to that figure as well as FIG. 5 for a further understanding of this arrangement. Note that each of the bars 92 is fixedly provided with a yoke 96 that pivotally receives the transversely extending head 98 of a T-shaped part of the universal joint 94, the relative pivotal nature of the connection between the yoke 96 and the head 98 providing relative rotation between the plates 88, 90 and the bars 92 about upright axes as above set forth. A shank portion 100 intersects the head portion 98 at right angles and extends through the plate 88 where it is rotatably supported on the outside surface of the latter by a bearing 102, this arrangement providing the relative rotation between the bars 92 and the plates 88, 90 about axes that are parallel to the axes of rotation of the plates 88, 90 as above set forth.

As long as the angle between each bar 92 and the shank 100 is something other than 180 degrees, such as is the case when the head 66 is skewed to either of the extreme positions of FIGS. 7 or 8, the bars 92 will remain in their preselected positions relative to one another wherein tines 104 spaced along each of the bars 92 and depending therefrom are pointed downwardly throughout a complete cycle of revolution of the reel 86. That is, since opposite ends of each bar 92 are held at angles to the plates 88, 90 when the head 66 is skewed, any effort by one end of a bar 92 to rotate relative to another bar 92 about the axis of the proximal shank 100 of the universal joint 94 will be resisted by the opposite end of that bar 92. Thus, because of the geometry involved, all of the bars 92 remain in their preselected rotative positions relative to one another (with the tines 104 pointing downwardly), although all do rotate relative to the plates 88 and 90 during a cycle of rotation of the reels 86 in order to maintain such downward direction of the tines 104.

While such maintenance of the "timing" between the bars 92 is thus well provided for by the angular relationships between the bars 92 and the end plates 88, 90, that source of timing maintenance is only available when the head 66 is indeed skewed. During that period in which it is in a straightforward position, such as illustrated in FIG. 6, the axes of the bars 92 line up with the axes of the shanks 100 of the universal joints 94 so that relative rotation can indeed take place between the bars 92 if the mechanism now to be described is not in use. Specifically, it will be noted primarily from FIGS. 1, 4 and 5 that an annular device 106 is mounted on the frame member 70 for rotation about an axis 108 (FIG. 1) that is eccentric to the axis of rotation of the end plate 88 defined by the longitudinal axis of a drive shaft 110 extending laterally from a hydraulic motor 112, the shaft 110 being fixed to the plate 88 through a suitable fastening assembly 114. The annular device 106 has an outturned track 116 defining the inner circular periphery thereof, and the track 116 is received between and confined by three triangularly positioned guide rollers 118 on end member 70 that are equally spaced radially from the eccentric axis 108. A plurality of cranks 120 are each pivotally connected at one end to the device 106 by respective pivots 122 and are each pivotally connected at the opposite end to that portion of the proximal shank 100 of universal joint 94 extending outwardly beyond the adjacent bearing 102. As a result of the fact that the length of each crank 120 between its pivot 122 at one end and the shank 100 at the opposite end is equal to the extent of eccentricity of the device 106 relative to the plate 88 (the distance between shaft 110 and the axis of rotation 108 of the device 106), the "timing" of the bars 92 relative to one another is maintained even during the time that the head 66 may be in its straightforward position of FIG. 6, and the reel 86 may be kept running during the time that switch over between the two extreme conditions of FIGS. 7 and 8 is being carried out.

As is believed apparent from the foregoing, the reel 86 is preferably driven by a hydraulic motor such as the motor 112 illustrated in connection with the left end plate 88. The right end plate 90 thus need only be rotatably mounted on the right side member 72 without connection to a source of power, such rotatable support being effected through a shaft 124 affixed to the plate 90 and journaled on the member 72 by suitable bearings 126.

The raking head 66 also includes a grill 128 looped below the reel 86 and consisting of a series of upturned rods 130 having lower and rearmost ends secured to the rear frame member 76 and upper and forwardmost ends secured to the front frame member 74. The rods 130 are equally spaced along the members 74, 76 in parallel relationship to one another so as to define spaces therebetween within which the tines 104 can operate. Each of the rods 130 makes an upright pivotal connection 132 with the front frame member 74 and a similar upright pivotal connection 134 with the rear frame member 76, all of the rods 130 being parallel not only to one another but also to the end plates 88, 90 and the side frame members 70, 72 so that the rods 130 may be swingably skewed horizontally as part of the head 66. Noteworthy also at this point is the fact that all of the upright pivots about which the rods 92 may rotate relative to the plate 88 or 90 at a given end of the head 66 are in line not only with one another but also with the corresponding pivots 78, 80 or 82, 84 of the frame 68. This, of course, is important insofar as proper skewing of the head 66 is concerned.

Switching the head 66 between its oppositely skewed positions is accomplished in part by a hydraulic piston and cylinder unit 136 extending between the top strap 32 on chassis 10 and a mounting lug 138 extending rearwardly from the front beam 18 adjacent the pivot 24. While the unit 136 will accomplish skewing of the chassis 10 in the desired direction, something additional is required to correspondingly skew all components of the head 66, and this is provided by a force-transmitting connection between the chassis 10 and the frame 68 broadly denoted by the numeral 140. Such force-transmitting connection 140 may simply take the form of an arm (not shown) suitably connected between one of the chassis beams 14, 16, 18, 20 (or the tongue 44), and one of the frame members 70, 72, 74 and 76, but in the preferred form as herein illustrated, the connection is in the nature of two flexible assemblies 142 and 144 at opposite lateral ends of the head 66. Inasmuch as the assemblies 142 and 144 are identical to one another, only the assembly 142 will herein be described as follows. Part of the assembly 142 consists of a circular wrapping element 146 that is positioned a short distance above the rear frame member 76 but is secured to the side frame member 70 for pivotal movement therewith about the axis of pivot 80. A chain 148 or the like is partially wrapped about the element 146 and is secured thereto at a certain circumferential location, while the opposite end of the chain 148 is secured to a sector-shaped component 150 also having an arcuate peripheral edge at the same height as the periphery of element 146 so that such edge of the component 150 is disposed for wrapping by the chain 148. The component 150 is rigidly held against rotation, and a compression spring mechanism 152 is inserted into the length of the chain 148 between its opposite ends.

A triangular stop 154 juts rearwardly from the left end of the frame member 76 in disposition for limiting engagement with the left frame member 70 when the head 66 is fully skewed into the position as illustrated in FIG. 5. A similar triangular stop 156 juts rearwardly from the right end of the rear frame member 76 in disposition for limiting engagement with the right frame member 72 when the head 66 is fully skewed to the condition of FIG. 8. The chain 148 for the assembly 142 is wrapped about its element 146 in a direction opposite to that of the chain 148 for assembly 144. Thus, when the element 146 of assembly 142 is being wrapped, the corresponding element 146 of the assembly 144 is being unwrapped, and vice versa. The sector components 150 of the two assemblies 142, 144 are also oppositely wrapped relative to one another so that while one is wrapping, the other is unwrapping.

Each of the sector-shaped components 150 is fixedly secured to the upper end of an upright post 158 that is rotatably housed by an upright sleeve 160 (clearest in FIG. 2) passing through and fixedly retained against rotation by the rear frame member 76. Below each sector-shaped component 150 but above the sleeve 160, a horizontally spaced pair of upper lift arms 162 are secured to the shaft 158 in a way that permits the upper arms 162 to swing about a horizontal axis 164 intersecting the post 158. Similarly, a horizontal pair of lower lift arms 166 (one only being shown in the drawings) are attached to the post 158 at a position where it extends downwardly below the sleeve 160 in such a manner that the lower arms 166 may swing vertically about horizontal pivots 168. The rearmost ends of the lift arms 162 and 166 are swingably secured to the chassis 10 by upper and lower pivots 170 and 172, respectively, and in this fashion, the head 66 is mounted on the chassis 10 for vertical swinging movement. Inasmuch as the lift arms 162, 166 are not adapted for horizontal swinging movement, they maintain the post 158 in a fixed position relative to the chassis 10 while the sleeves 160 of the rear frame member 76 turn about the posts 158 during skewing of the head 66.

The head 66 is floatingly supported through flotation means broadly denoted by the numeral 174, such means 174 comprising a pair of identical assemblies 176 and 178 at opposite lateral ends of the chassis 10. Using the assembly 176 as an example (and viewing FIG. 2), it includes an inclined rod 180 connected at its lowermost end to the pivot 168 and extending upwardly and rearwardly therefrom through a sleeve 182 having a trunnion connection with a bell crank 184 at 186. Although the rod 180 can move longitudinally within the sleeve 182, the latter is fixed against longitudinal movement by the trunnion connection 186 although it is swingable relative to the bell crank 184 by virtue of such trunnion connection. A coil spring 188 is trapped between the upper, rearmost end of the sleeve 182 (forming an abutment) and an end cap 190 secured to the rearmost end of the rod 180. Thus, downward pull on the rod 180 by the rake head 66 as it attempts to swing downwardly about the pivots 170 and 172 causes the coil spring 188 to be compressed against the abutment defined by the upper end of the sleeve 182.

The bell crank 184 of each assembly 176, 178 is pivoted at one corner thereof to the corresponding chassis beam 14 or 16 by a pivot 192 (FIG. 2) for rocking movement in a fore-and-aft direction. The remaining corner of each bell crank 184 is pivotally joined to one end of a connector 194 that extends rearwardly therefrom for connection to a lateral extension of the rear beam 20 beyond the pivot 22 or 28 at a connection point 196. As a result of this arrangement, the bell cranks 184 may be rocked forwardly or rearwardly depending upon the direction in which the chassis 10 is skewed, so as to change the effective distance of the upper abutment and of the sleeve 182 from the pivot points 168 and thereby correspondingly affect the height of that end of the head 66 and the compression force on the corresponding spring 188.

OPERATION

During over-the-road travel the implement will most likely, although not necessarily, be maintained in its straightforward, unskewed condition as illustrated for example in FIGS. 4 and 6. The tongue 44 may or may not be disposed in parallel relationship with the normal path of travel of the implement depending upon the rotative position of the arched portion 50 of the tongue 44 relative to the upright portion 52 as maintained by the fasteners 58. In any event, once the arched portion 50 has been secured in place relative to the upright portion 52, the tongue 44 remains constantly in such preselected attitude with respect to the path of travel regardless of the position of the head 66.

When the hydraulic cylinder 62 is fully contracted as illustrated in FIG. 3 the result is that the chassis 10 is in a substantially horizontal disposition with the flotation springs 188 holding the head 66 in its working height position of FIGS. 1 and 2. Upon extension of the cylinder 62, however, the chassis 10 has a tendency to rock in a clockwise direction about the wheel axles 30 as the joint defined by the intersection of the chassis 10 and tongue 44 at horizontal pivot 42 tends to unbuckle, thereby lifting the rake head 66 upwardly into a more elevated position for safer road travel, such more elevated position not being illustrated. In any event, with the head 66 disposed at a working height as illustrated in FIGS. 1 and 2, supplying hydraulic fluid to the motor 112 causes the reel 86 to revolve in a clockwise direction viewing FIGS. 1 and 2 so that the tines 104 are sweeping downwardly and then forwardly as indicated by the arrow in FIG. 2.

Referring now perhaps most advantageously to FIGS. 6, 7 and 8, if the hydraulic cylinder 136 is retracted from its FIG. 6 position, this causes the chassis 10 to skew in a counterclockwise direction so that the right wheel 12 becomes disposed forwardly of the left wheel 12 and the longitudinal axis of the chassis 10 makes an oblique angle with the path of travel of the implement wherein the right end of the axis is disposed forwardly of the left end thereof. This action has the effect additionally of canting the rear frame member 76 of the frame 68 so that the member 76 remains parallel with the chassis beams 18 and 20. Thus, if a "nonskewable" reel were supported on the frame member 76 having crop-engaging components that rotated in paths of travel perpendicular to the member 76, such canting of member 76 would have the effect of directing crop encountered by the head 66 toward the left side of the path of travel. While such an arrangement is within the scope of the present invention and may well provide one alternative embodiment thereof, it is believed that maintaining the paths of travel of the crop-engaging tines perpendicular to the frame member 76 will result only in a relatively short leftward delivery component on the part of the tines during each cycle of revolution, thereby requiring that crop beginning at the right end of the head 66 will have to be handled several times by separate tines in order to transfer the same fully leftwardly off the left end of the head 66.

Accordingly, it is felt that it is most desirable not only to cock the frame member 76, but also to skew the reel 86 as hereinabove described so that the leftward component of travel of the tines 104 is substantially larger than would otherwise be the case, such component of travel being substantially at right angles to the path of travel of the implement.

Such additional skewing then of the reel 86 is accomplished by the force-transmitting connection 140 that responds to positional changes in the chassis 10 and the frame member 76 during skewing. Specifically, when the cylinder 136 is contracted so as to skew the chassis 10 leftwardly as in FIG. 7, the right end of the frame member 76 swings progressively farther and farther away from the right chassis beam 16, thus tensioning the chain 148 of the assembly 144 to such an extent that the element 146 of assembly 144 is rotated counterclockwise, thereby causing the right frame member 72 to also swing counterclockwise. This, of course, has the effect then of skewing the remaining portions of the head 66 leftwardly, including the tine bars 92 which are displaced longitudinally of one another at this time, but which never move out of their initial timed relationship to one another. Inasmuch as the left frame member 70 is swinging counterclockwise, this has the effect of wrapping up the chain 148 of assembly 142 on the element 146 thereof, this primarily being a slack take up operation since the transmission of force necessary to actually skew the head 66 is being made through the right assembly 144. The length of the chain 148 of the right assembly 144 is such that the spring 152 thereof will be caused to be compressed in order for the left frame member 70 to come to rest against the left stop 154, at which time the head 66 is in its fully leftwardly skewed condition for leftward delivery of the crop encountered by the implement.

Now, if the operator desires to switch the direction of crop delivery to the right, as illustrated in FIG. 8, it is necessary only to extend the cylinder 136 without stopping rotation of the reel 86 and to continue such extension until the implement becomes fully rightwardly skewed. As illustrated in FIG. 8, when in this condition the left ground wheel 12 is disposed forwardly of the right ground wheel 12 and an opposite oblique relationship is obtained between the chassis 10 and the path of travel of the implement as well as between the rake head 66 and the path of travel of the implement. Inasmuch as switching from left to righthand delivery causes the left end of the frame member 76 to move clockwise further and further away from the left chassis beam 14, the chain 148 of the left assembly 142 becomes tensioned while the chain 148 of the right assembly 144 becomes slackened relatively speaking. The progressively increased tension applied to the chain 148 of the left assembly 142 causes the element 146 thereof to rotate in a clockwise direction, thereby correspondingly swinging the left frame member 70 and imparting a rightward skewing action to the remaining components of the head 66. As with the right assembly 144, the left assembly 142 has the length of its chain 148 such that the spring 152 thereof will necessarily be compressed in order to have the right frame member 72 bottom out against the right stop 156 in a fully rightwardly skewed condition.

Interestingly, the direction of rotation imparted to the reel 86 by the hydraulic motor 112 need not be reversed even though the skewed condition of the reel 86 may be reversed from a leftward delivery to a rightward delivery. This is due to the fact that the end plates 88 and 90 are turned through a full 180 degree arc when the head 66 is switched from right to left delivery and vice versa. Note, for example, that in FIG. 5 the left plate 88 may be described as "forwardly facing" corresponding to the condition of things in FIG. 7. On the other hand, note in FIG. 8 that the left frame member 70 has been swung through a full 180 degrees relative to its position in FIG. 7, meaning also now that the plate 88 will be reversed so that it is now "rearwardly facing," the opposite, of course, being true of the right end plate 90. Thus, the direction of rotation of the shaft 110 from the hydraulic motor 112 remains constant, such shaft merely being itself reversed end-for-end so that the same direction of rotation results in a different lateral direction of motion for the raking tines 104.

It should also be pointed out at this juncture that the tine bars 92 are retained against rotation relative to one another during the period that the head 66 may be switched between right and left delivery. While the angular relationships between the rods 92 and the end plates 88, 90 prevents the rods 92 from getting out of "time" with one another during disposition of the head 66 in either of its skewed positions, such retention in proper timed relationship is effected when the head 66 is in its straightforward condition as in FIG. 6 by virtue of the eccentrically disposed device 106 at the left end of the reel 86 and the cranks 122 between the device 106 and the bars 92. As aforementioned, the fact that the length of the cranks 120 equals the extent of eccentricity of the device 106 supported for rotation by the rollers 118 assures that the proper timing of the bars 92 will be maintained during this period of "switch over" or roading.

It will also be noted that when the head 66 is in one of its fully skewed positions, the center of gravity thereof becomes located to one side of the central fore-and-aft axis of the implement. Thus, the implement tends to be disproportionately weighted to one side such that the head 66 would tend to dip downwardly on the disproportionately weighted side were it not for the special compensating structure used in connection with the two flotation assemblies 176 and 178.

For example, when the head 66 is skewed leftwardly as in FIGS. 5 and 7, the connection point 196 of the connector 194 to the leftward extension of the rear chassis beam 20 is rearwardly displaced from its normal position, thereby causing a rearward rocking of the corresponding bell crank 184 (FIG. 2) which in turn raises the sleeve 182 to effectively elevate the lower abutment for the compression spring 188 (such abutment function being provided for by the upper end of the sleeve 182). Consequently, increased lifting force is made available for the left end of the rake 66 to compensate for the disproportionate load on that portion of the head 66. Correspondingly, the connection point 196 of the connector 194 with the right extension of the rear chassis beam 20 beyond its pivot 28 is disposed forwardly of its normal position at this time, thereby rocking its bell crank 184 forwardly so as to effectively lower the lower abutment for the compression spring 188 on that side of the implement. This, then, decreases the amount of lifting force on the right end of the head 66 to compensate for the decreased amount of mass at that location. The reverse is, of course, true when the head 66 is rightwardly skewed as in FIG. 8.

Having thus described the invention, what is claimed as new and desired to be secured by Letters Patent is:

1. A pull-type farm implement comprising:
a chassis having a towing member extending forwardly therefrom in a predetermined angular attitude with respect to the normal path of travel of the implement;
ground-engaging means supporting said chassis for movement along said path of travel;
a header carried by said chassis and operable to deliver ground-engaging crop material from a position in line with said path of travel to a laterally displaced position on a selected one side of said path of travel,
said chassis being provided with means for permitting up-and-down swinging movement of said header relative to said ground-engaging support means; and
remotely operable control means coupled with said header for selectively reversing the direction of delivery thereof from one side of said path of travel to the other without disturbing said predetermined attitude of said member.

2. A pull-type farm implement as claimed in claim 1, wherein said header is mounted for swinging movement between a pair of opposite extreme positions corresponding to the opposite directions of crop delivery thereof.

3. A pull-type farm implement as claimed in claim 2, wherein said header includes a reel having transversely extending bars that move in closed loops of travel during rotation of the reel, said reel being skewable for movement between said opposite extreme positions of the delivery means, said bars shifting longitudinally of one another to redirect said loops of travel during skewing of the reel between said opposite extreme positions.

4. A pull-type farm implement as claimed in claim 3, wherein said header further includes a frame supporting said reel for rotation and skewing, said frame including members movable in parallelism with said bars during said skewing of the reel.

5. A pull-type farm implement as claimed in claim 4, wherein said members are part of a four-bar, parallel linkage that comprises said frame.

6. A towable farm implement comprising:
a mobile chassis having a towing member extending forwardly therefrom in a predetermined angular attitude with respect to the normal path of travel of the implement;
means carried by said chassis for delivering ground-engaging crop material from a position in line with said path of travel to a laterally displaced position on a selected one side of said path of travel;
remotely operable control means coupled with said delivery means for selectively switching the direction of delivery of said delivery means from one side of said path of travel to the other without disturbing said predetermined attitude of said member,
said crop delivery means being mounted for swinging movement between a pair of opposite extreme positions corresponding to the opposite directions of crop delivery thereof,
said crop delivery means including a reel having transversely extending bars that move in closed loops of travel during rotation of the reel, said reel being skewable for movement between said opposite extreme positions of the delivery means, said bars shifting longitudinally of one another to redirect said loops of travel during skewing of the reel between said opposite extreme positions,
said reel further including a pair of opposite, rotatable, parallel end supports for said bars, said supports changing their respective planes of rotation during said skewing of the reel but maintaining their parallel relationship to one another,
said bars being mounted on said supports for rotation relative to the latter about axes parallel to the axes of rotation of the supports; and
means for maintaining said bars in a predetermined rotative relationship to one another throughout movement of the reel between its oppositely skewed positions.

7. A towable farm implement as claimed in claim 6, wherein said maintaining means includes a device adjacent to one of said supports and rotatable about an axis eccentric to the axis of rotation of said one support, said maintaining means further including a crank for each of said bars, respectively, one end of each crank being secured to its bar for movement therewith relative to said one support and the other end of the crank being pivotally connected to said device, the distance between said ends of the crank corresponding to the extent of eccentricity of said device.

8. A pull-type farm implement as claimed in claim 3, wherein each of said bars includes a plurality of longitudinally spaced, depending tines, said tines moving substantially perpendicularly to said path of travel when the reel is in either of said opposite, extreme positions.

9. A towable farm implement comprising:
a mobile chassis having a towing member extending forwardly therefrom in a predetermined angular attitude with respect to the normal path of travel of the implement;
means carried by said chassis for delivering ground-engaging crop material from a position in line with said path of travel to a laterally displaced position on a selected one side of said path of travel; and
remotely operable control means coupled with said delivery means for selectively switching the direction of delivery of said delivery means from one side of said path of travel to the other without disturbing said predetermined attitude of said member,
said chassis including a plurality of beams arranged in a parallel, four-bar linkage that is skewable in either of two opposite, lateral directions to dispose one pair of the beams in an oblique disposition relative to said path of travel and another pair of said beams in parallel relationship to said path of travel.

10. A towable farm implement as claimed in claim 9, wherein said chassis is provided with ground-engaging means secured to said another pair of beams to remain parallel to said path of travel during skewing of the chassis.

11. A towable farm implement as claimed in claim 9, wherein said tongue is mounted to maintain the angle between the same and one beam of said one pair always equal to the angle between the tongue and the second beam of said one pair.

12. A towable farm implement as claimed in claim 9, wherein said control means includes a fluid-pressure piston and cylinder unit mounted to effect said skewing of the chassis.

13. A towable farm implement as claimed in claim 9, wherein said delivery means includes a frame comprising a plurality of members arranged in a second parallel, four-bar linkage that is skewable in either of two opposite, lateral directions to two opposite extreme positions.

14. A towable farm implement as claimed in claim 13, wherein said control means includes a fluid-pressure piston and cylinder unit for skewing one of the linkages, and force-transmitting means between the two linkages for skewing the other linkage in response to skewing of said one linkage by said unit.

15. A towable farm implement as claimed in claim 14, wherein said one linkage comprises said chassis.

16. A towable farm implement as claimed in claim 15, wherein said frame includes stop means between its member for precluding skewing of the frame beyond said extreme positions thereof.

17. A towable farm implement as claimed in claim 16, wherein said force-transmitting means includes yieldable means biasing the frame toward said extreme positions with a corresponding member against said stop means.

18. A towable farm implement as claimed in claim 13, wherein said delivery means further includes a reel having a pair of opposite end supports mounted on respective ones of an opposite pair of said frame members for rotation relative thereto, said reel further having transversely extending bars attached at opposite ends to said supports for rotation therewith, said supports being disposed in parallelism with the frame members supporting the same and said bars being pivotally attached to the supports in parallelism with another pair of said frame members for skewing of the reel along with skewing of the frame.

19. A towable farm implement as claimed in claim 18, wherein each of said bars includes a plurality of longitudinally spaced, depending tines, said tines moving substantially perpendicularly to said path of travel when the reel is in either of said opposite, extreme positions.

20. A pull-type farm implement as claimed in claim 1, wherein said tongue is upwardly arched over said header for clearing the latter in all positions of vertical swinging movement thereof.

21. A pull-type farm implement as claimed in claim 1, there being flotation means between the chassis and the header for yieldably biasing the latter upwardly, said header having a center of gravity that is displaced to one side of the central, fore-and-aft axis of the implement when the header is disposed for directing materials to one side or the other of said path of travel, said flotation means including structure associated therewith that enables the flotation means to compensate for said off-center disposition of the center of gravity of the header in response to placing the header in disposition for directing material to one side or the other of said path of travel.

22. A pull-type farm implement as claimed in claim 21, wherein said flotation means includes an abutment on said chassis and yieldable means engaging said abutment and connected in force-transmitting relationship with said header, said structure including means for shifting the abutment relative to the header in a direction to increase the force applied by said yieldable means to the portion of the header associated with the off-center center of gravity.

23. A pull-type farm implement as claimed in claim 22, wherein said chassis includes a plurality of beams arranged in a parallel, four-bar linkage that is skewed into one or the other of two opposite, oblique dispositions relative to said path of travel in order to place the header in condition for directing material to a side of the path of travel, said abutment being shiftably mounted on one of said beams, said shifting means comprising a connector between the abutment and another of said beams for shifting the abutment in response to relative positional changing of said one beam and said another beam during skewing of the chassis.

* * * * *